United States Patent [19]

Yonezu et al.

[11] 4,336,314
[45] Jun. 22, 1982

[54] PASTED TYPE LEAD-ACID BATTERY

[75] Inventors: Kunio Yonezu; Masaharu Tsubota; Katsuhiro Takahashi, all of Kyoto, Japan

[73] Assignee: Japan Storage Battery Company, Ltd., Kyoto, Japan

[21] Appl. No.: 136,643

[22] Filed: Apr. 2, 1980

[30] Foreign Application Priority Data

Oct. 24, 1979 [JP] Japan .................................. 54-138223

[51] Int. Cl.³ ......................... H01M 2/16; H01M 2/02
[52] U.S. Cl. ....................................... 429/66; 429/145; 429/208; 429/186
[58] Field of Search .................. 429/66, 159, 186, 208, 429/241, 145, 161, 136

[56] References Cited

U.S. PATENT DOCUMENTS

| | | | |
|---|---|---|---|
| 1,029,015 | 6/1912 | Johnson | 429/66 |
| 1,379,088 | 5/1921 | Edison | 429/145 |
| 1,900,307 | 3/1933 | Snyder | 429/186 |
| 2,625,574 | 1/1953 | Fuller | 429/241 |
| 2,812,376 | 11/1957 | Yardney | 429/66 |
| 2,906,805 | 7/1959 | Zahn | 429/66 |
| 3,014,085 | 12/1961 | Bachman | 429/145 |
| 3,159,507 | 12/1964 | Abbe et al. | 429/145 |
| 4,020,244 | 4/1977 | Selinko | 429/159 |

FOREIGN PATENT DOCUMENTS

| | | | |
|---|---|---|---|
| 2266318 | 11/1975 | France | 429/136 |
| 54-22530 | 2/1979 | Japan | 429/66 |

Primary Examiner—Donald L. Walton
Attorney, Agent, or Firm—Sughrue, Mion, Zinn, Macpeak & Seas

[57] ABSTRACT

A pasted type lead-acid battery with greatly extended service life and capacity over the usable service life thereof has a glass mat, which may have a dual layer construction, disposed adjacent positive plates of assembled elements. Each plate is constructed as a grid having main and small members with the small members entirely embedded in an active material. Pressure is applied to the assembled element within disclosed ranges. The assembled elements may be pressurized by a binding band or pressure may be applied from outside the battery container. In the latter case, the side and bottom walls of the container are made pleat-shaped.

12 Claims, 14 Drawing Figures

PASTED TYPE LEAD-ACID BATTERY

BACKGROUND OF THE INVENTION

The present invention relates to an improvement in a pasted type lead-acid battery. More particularly, the invention relates to a method for producing a pasted type lead-acid battery which is capable of high performance and which has a long service life making it especially suitable for cycle use in an electric vehicle, a golf cart, or the like.

A pasted type lead-acid battery has a superior discharge capacity and especially a high rate discharge capacity when compared to a tubular type lead-acid battery. Therefore, these batteries have been extensively used as a drive power source in electric vehicle and the like. However, if deep discharge is repeatedly carried out, the service life of a pasted type lead-acid battery is shorter than that of a tubular type lead-acid battery. Furthermore, in a pasted type lead-acid battery, the weight of certain components, such as its grids which do not relate to the charge or discharge reaction, is reduced in order to increase the energy density of the battery. As a result, the structural supporting capability of the grid for the active material is decreased and the battery's service life is reduced accordingly. On the other hand, improvement of active material utilization may effectively increase the energy density but, unfortunately, the improvement cannot be achieved without reducing the service life of the battery for cycle use. Thus, if the energy density of a pasted type lead-acid battery is increased, then the service life in cycle use correspondingly decreases.

The service life in cycle use of a pasted type lead-acid battery is, in general, primarily dependent on the service life of the positive plates. Accordingly, in order to increase the service life of a pasted type lead-acid battery, it is essential that the service life of the positive plates be increased. Capacity loss of the pasted type positive plates during a charge-discharge cycle is attributed to the fact that the active material is softened and accordingly sheds. That is, the volume of the positive plate active material ($PbO_2$) is changed by charge and discharge. More specifically, when the active material $PbO_2$ is changed into $PbSO_4$ through discharge, the molecular volume increases by a factor of 1.92. In contrast, during the charge $PbSO_4$ changes to $PbO_2$ and the volume of the material contracts by a factor of 1/1.92. However, it should be noted that the volume change in the active material layer due to charge and discharge is not reversible. In other words, as the charge and discharge is repeated, the plate is gradually expanded as a result of which large pores or voids are formed in the active material and the plate becomes more porous. As the porosity increases, the cohesion of the active material particles is gradually lowered thereby reducing electrical contact to the active material particles which decreases the capacity of the positive plates. In this condition, the active material layer is softened, and shedding of the active material particles from the plate results. This causes the successive degradation of the positive plate during deep charge and discharge cycle use.

In order to develop an electric vehicle which has an acceptable performance and is economical, it is essential to provide a lead-acid battery which has a high energy and power density and has a long cyclic charge and discharge life. In order to accomplish this, it is necessary to provide a pasted type positive plate which has a long service life.

In order to improve the service life for cycle use of a pasted type lead-acid battery, it is necessary to prevent structural change of the positive active material due to charge and discharge, specifically, the expansion thereof. There are a variety of currently available techniques for preventing the expansion of the active material. In one of the known techniques which can be applied to the pasted type positive plate, cloth made of glass or synthetic fibers having an acid resistance is wrapped around the surface of the plate or it is placed over the surface of the plate so as to apply pressure to the active material surface. In another technique, a bag is formed using such a cloth, and the positive plate is disposed inside the bag similar to the tubular type plate. These techniques may be effective in preventing shedding of the positive active material particles from the plate when the cohesion of the positive active material particles is reduced. However, these techniques do little to prevent the expansion of the active material and, accordingly, cannot effectively increase the service life of the battery as is desired.

In a typical conventional technique, a porous material such as a glass mat having some flexibility is disposed under pressure in contact with the surface of the positive plate. With this technique, a pressure of 5 to 20 $kg/dm^2$ is typically applied to an assembled element in the dry state. The service life of a pasted type lead-acid battery using such a glass mat is longer than that of a pasted type lead-acid battery without a glass mat. However, it is still much shorter than that of tubular type lead-acid battery. Thus, it can be understood that the deep charge and discharge life cannot be sufficiently increased merely by using a glass mat.

SUMMARY OF THE INVENTION

Accordingly, an object of this invention is to provide a technique for constructing a pasted type lead-acid battery in which an assembled element is mechanically pressurized to press the positive plates and thereby to prevent changes in the structure of the active material whereby the charge and discharge cycle life of the battery are remarkably increased.

In order to achieve this and other objects of the invention, pressure is applied to the assembled element in the dry state, that is, before the electrolyte is poured into the battery container. The degree of pressure is controlled to be within the range of 20 to 120 $kg/dm^2$. The term "degree of pressure" as herein used is intended to mean a pressure which is applied to the assembled element in the dry state in the vertical direction on the plate plane and is measured per unitary area on the side plate of the assembled element, and is indicated in units of "$kg/dm^2$". Furthermore, it is preferable that a porous layer which is composed of a woven or non-woven fabric made of fibers having an acid and oxidation resistance is disposed in contact with each positive plate in order to distribute the pressure uniformly on the positive plates. The porous layer is preferably made of the above-described glass mat. The porosity and the pore-size distribution of the glass mat greatly affect the service life of the positive plate. Taking this into account, in accordance with the invention, a glass mat having a dual layer structure composed of a first layer of glass fibers 1 $\mu m$ or less in diameter and a second layer of glass fibers at least 10 $\mu m$ in diameter is provided in such a manner that the first layer is in contact with the surface of the positive plate.

In order that pressure is effectively and uniformly distributed on the active material of the negative and positive plates, especially to those of the positive plates, the grid of the plates is so constructed that the small members of the grid do not expose in the surface of the plate. As a result, the service life of the battery is remarkably increased.

Furthermore, in order to maintain the assembled elements under a constant degree of pressure in a pasted type lead-acid battery constructed according to the invention, a relatively elastic container is employed as the battery container so that the assembled elements are mechanically pressurized from outside of the container or the assembled elements are otherwise pressurized by a container having predetermined dimensions. In the latter case, the material forming the container must have a high bending strength. A container which is made of thermoplastic material and which is partially reinforced with a light metal such as aluminum alloy is most suitable.

DESCRIPTION OF THE PREFERRED EMBODIMENTS

A specific feature of a pasted type lead-acid battery according to the present invention resides in the stacking of positive plates and negative plates alternately one on another through separators and glass mats to form an assembled element which is held under pressure so as to prevent the softening and shedding off of the positive active material.

Simple pressurizing or depression of the plates has been employed in the field of lead-acid batteries. However, it should be noted that the cyclic charge and discharge life were not increased by the simple use of pressure. That is, the service life of the battery cannot be effectively increased merely by pressurizing the plates. The degree of pressure applied to the assembled element, the structure of each plate, and the material and construction of glass mats which are most suitable for improving the service life must all be taken into account as has been accomplished with the invention.

An investigation into the relationship between the degree of pressure and the service life was made in order to determine the optimum degree of pressure to be applied to the assembled element. In this investigation, a cell having a 5 hR capacity of 150 Ah was prepared using positive plates 3.0 mm in thickness and negative plates 2.0 mm in thickness. Two types of glass mats were tested. The first of the glass mats was in the form of a layer 2.4 mm in thickness at a pressure of 20 kg/dm$^2$. The first type was provided by felting glass fibers about 19 μm in diameter and using an acrylic ester as a binder.

Figure 1:
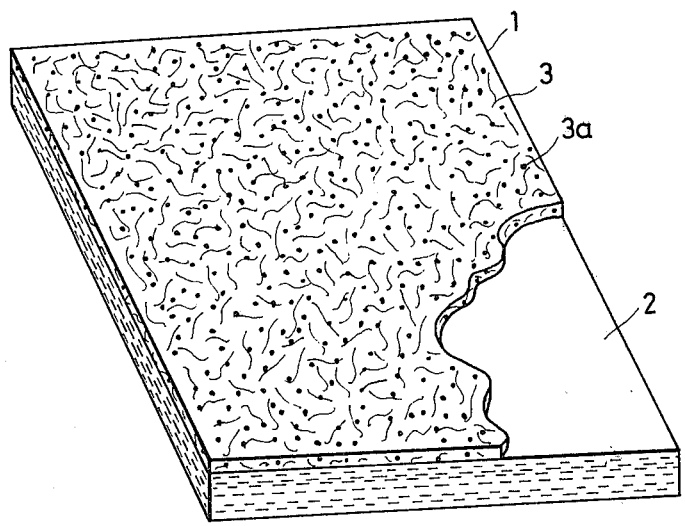
FIG. 1 is an explanatory diagram showing the construction of a glass mat having a dual layer structure which is employed in one embodiment of a pasted type lead-acid battery according to the invention.

The second type of glass mat had a dual layer structure as shown in FIG. 1. In this type of glass mat 1, the above-described glass mat 2 is integral with a glass mat 3 which is higher in density than the glass mat 2. The glass mat layer 3 is made of glass fibers 0.3 μm in diameter. The distance between the fibers of the glass mat layer 3 are much smaller than those of the glass mat layer 2 so as to prevent the positive plate active material particles from penetrating the mat. An assembled element is formed in such a manner that the glass mat layer 3 having the higher density is in contact with the surface of the positive plate. In FIG. 1, the total thickness of the glass mat 1 having the dual layer structure is about 2.4 mm under a pressure of 20 kg/dm$^2$, while the thickness of the glass mat layer 2 made of glass fibers 19 μm in diameter is 2.0 mm and the thickness of the glass mat layer 3 made of glass fiber 0.3 μm in diameter is 0.4 mm. Bored-openings 3a are formed at random in the glass mat layer 3.

Figure 2:
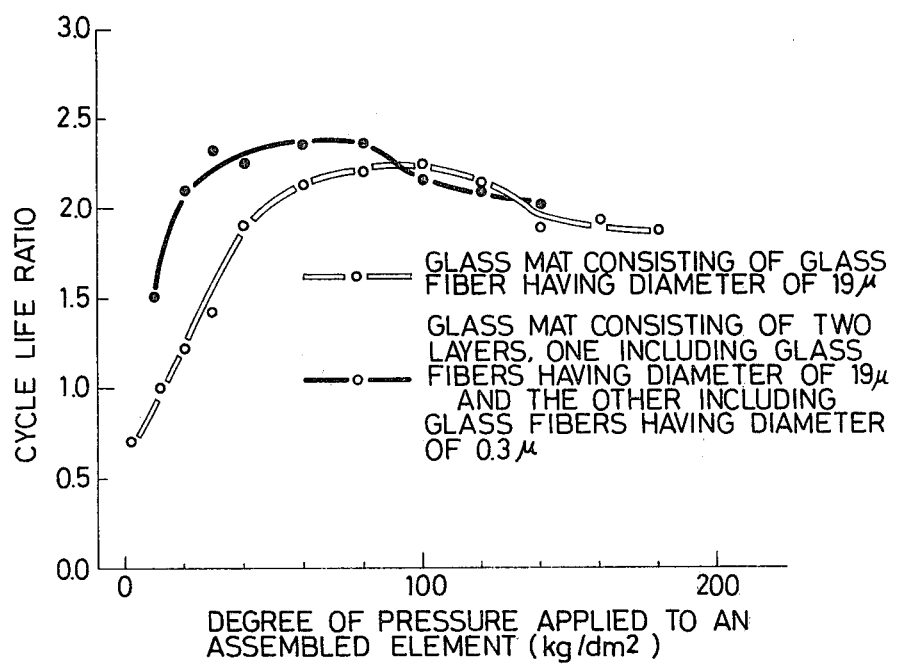
FIG. 2 is a graphical representation indicating the results of experiments on the relationship between degree of pressure applied to an assembled element and the battery's cycle life.
Figure 3:
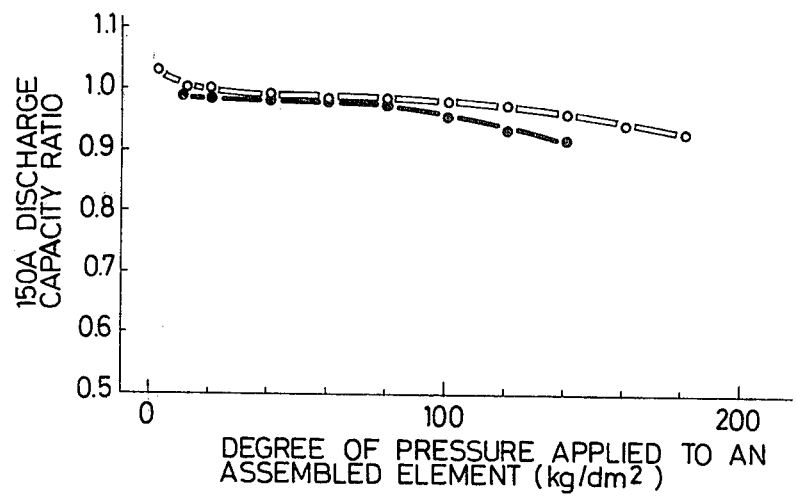
FIG. 3 is also a graphical representation indicating the results of experiments on the relationship between degree of pressure applied to an assembled element and high rate discharge capacity.

The relationships between cycle life and capacity for the degree of pressure of the assembled element in the dry state (before electrolyte pour) which were formed using the above-described two types of glass mats were investigated. The results of the investigations of the two types are indicated in FIGS. 2 and 3, respectively. The cycle life test conditions were 37.5 A×3h for discharge and 27.0 A×5h for charge. The tests were carried out in a water bath at 30° C.

FIGS. 2 and 3 indicate cycle life ratios and discharge capacity ratios, respectively, in comparison with the cycle life and the discharge capacity for a pasted type lead-acid cell having an assembled element using only a glass mat made of glass fibers 19 μm in diameter under the pressure of 10 kg/dm². It is apparent from FIG. 2 that as the degree of pressure applied to the assembled element increases, the charge and discharge cycle life also increases although the relation therebetween is not linear. That is, in a pressure range of from 40 to 60 kg/dm², the life is abruptly increased by a factor of 2 to 2.5 as the pressure increased. Thereafter, up to about 100 kg/dm², the life remains substantially unchanged. However, if the pressure exceeds about 100 kg/dm², the life decreases. The tendency to decrease depends on the type of glass mat used. The life of the lead-acid cell using the glass mat having a dual layer structure was found to be excellent at a low pressure range while the life of such a cell increases by a factor of about two at a pressure of 20 kg/dm².

Moreover, it has been discovered that the effect on discharge capacity of a pressure applied to an assembled element is greater with respect to the high rate discharge capacity of the cell. This is clear from FIG. 3 which indicates variations of 150 A discharge capacity with the degree of pressure in a water bath at 30° C. of the battery. As the assembled element is pressurized, the discharge capacity decreases. However, up to about 100 kg/dm², the decrement of the capacity is only about 2 to 3%. When the pressure exceeds about 100 kg/dm², the capacity decreases somewhat remarkably.

It has also been discovered that the capacity of the battery with a glass mat having a dual layer structure made of a layer of glass fibers 19 μm in diameter and a layer of glass fibers 0.3 μm in diameter is slightly smaller than that of a glass mat made of a single layer of glass fibers of 19 μm diameter, and the percentage of capacity decrease of the former with pressurization is slightly larger than that of the latter. This appears to be due to the fact that the minute pores in the layer of glass fibers 0.3 μm in diameter are smaller than those in the layer of glass fibers 19 μm in diameter and therefore it is difficult to diffuse electrolyte into the former. Also, if pressure is applied, then the diffusion of electrolyte becomes more difficult.

Accordingly, it is necessary to form the openings 3a 0.1 to 2 mm in diameter in the layer of glass fibers 0.3 μm in diameter as shown in FIG. 1 so as to facilitate the diffusion of electrolyte therein. It is suitable that the percentage of area occupied by the openings 3a is less than 30% of the area of the geometrical surface of glass mat. If the percentage of this area is more than 30%, then the glass mat cannot supress the penetrating of the positive active material particles.

As is apparent from the experimental results indicated in FIGS. 2 and 3, the pressure applied to the assembled element should not be too high. That is, if too great a pressure is applied to the assembled element, then the discharge capacity of the cell is decreased. The optimum degree of pressure with which the capacity is little reduced and the cycle life increase is increased depends on the material and the construction of the glass mat used. The degree of pressure ranging from 40 to 120 kg/dm² are suitable for a mat made of glass fiber 10 to 30 μm in diameter and the degree of pressure ranging from 20 to 80 kg/dm² are suitable for a glass mat having a dual structure composed of a layer of glass fibers 10 to 30 μm in diameter and a layer of glass fibers less than 1.0 μm in diameter.

Figure 4:
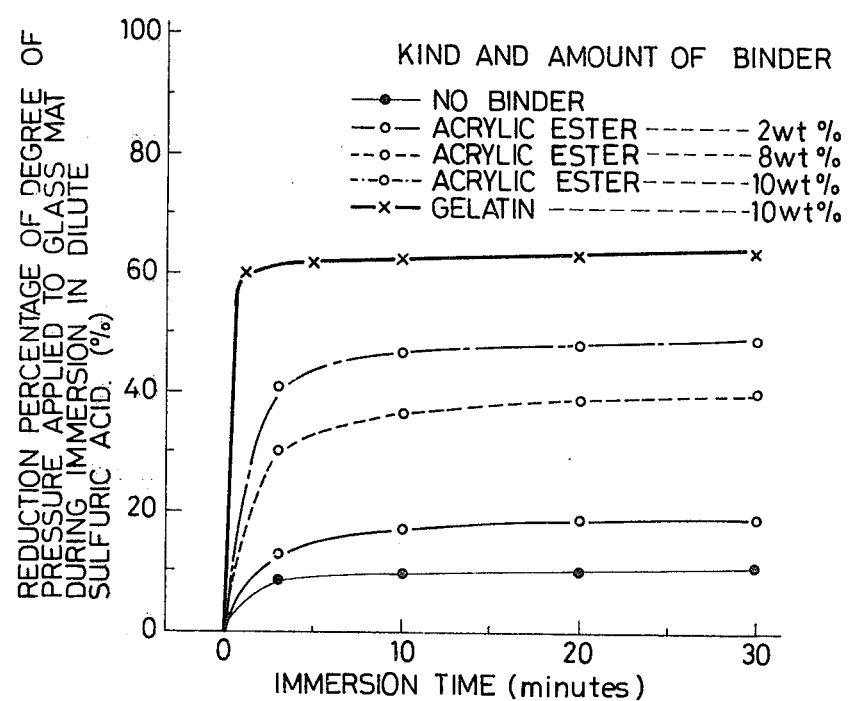
FIG. 4 is a graphical representation indicating the percentage of reduction of degree of pressure with respect to time of immersion which occurs when a dry glass mat to which a pressure of 40 kg/dm$^2$ has been applied is immersed in dilute sulfuric acid having a specific gravity of 1.28 at 20° C.

The pressure applied to the assembled element presses on each plate and prevents the aforementioned expansion effect attributed to changes in structure of the active material layer. During use, it is necessary to prevent a reduction of the degree of pressure. It has been found that the greatest cause for reduction of the pressure applied to the assembled element is that, when the glass mat is wetted, its thickness decreases. It is apparent from FIG. 4 that the degree of reduction of pressure applied to the glass mat relates to the technique used in fabricating the glass mat and especially to the kind and quantity of binder used and to the apparent density of the glass mat. In the case where a binder of a synthetic resin group having acid and oxidation resistance is employed, any reduction of the thickness, which may lead to a reduction of the pressure when the glass mat is immersed in dilute sulfuric acid, can be minimized by reducing the quantity of the binder as much as possible. It is desirable that, for a glass mat employed in a lead-acid battery according to the invention, the degree of pressure applied when the mat is immersed in dilute sulfuric acid be more than 70% of the degree of pressure which is applied when the mat is in the dry state. This is extremely important in the case where the pressure applied to the assembled element is selected to be within the lower range of optimum degree of pressure, namely about 20 to 40 kg/dm² in the dry state. In the case of a glass mat for which the degree of pressure applied when it is immersed in dilute sulfuric acid is decreased to about 40% of the degree of pressure in the dry state and if a pressure of 20 kg/dm² is applied to the assembled element in the dry state, then the degree of pressure applied when it is immersed in dilute sulfuric acid may be as small as 8 kg/dm². A pressure of this order cannot sufficiently prevent the expansion of the positive active material with the result that the cyclic charge and discharge life of the battery is little improved.

An essential factor of a pasted type lead-acid battery in which the plates are pressurized through glass mats is the thickness of the glass mats. It is not universally true that the life of such a battery is improved by applying pressure to the assembled element through the glass mats. In other words, the thickness of the glass mats should have a value most suitable for the assembled element pressurized. According to the results of experiments indicated in Table 1 below, with respect to the thickness of a glass mat for such a lead-acid battery, its thickness Tg after pressure has been applied to the glass mat in the dry state must be more than about half of the thickness Tp of the positive plate.

TABLE 1

| Relation between Tg/Tp and Service Life | |
|---|---|
| Tg/Tp | Cycle Life Ratio |
| 0.2 | 0.8 |
| 0.4 | 1.3 |
| 0.6 | 2.0 |
| 0.8 | 2.1 |
| 1.0 | 2.2 |
| 1.5 | 2.3 |

Indicated in Table 1 are the results of cyclic charge and discharge life tests which were conducted by varying the value of Tg/Tp (Tp=3.0 mm) with the degree of pressure of the assembled element maintained at 40 kg/dm² in a dry state. The cycle life of the cell is indicated by a ratio which is calculated relative to a conventional pasted type lead-acid cell which has an assembled element with a degree of pressure of about 10 kg/dm² and with Tg/Tp being 0.3. It is apparent from Table 1 that if the glass mat thickness after pressure is thinner, the cycle life is shorter than that of a conventional lead-acid cell. However, when the value Tg/Tp exceeds about 0.5, the cycle life of the cell increases remarkably. Thus, it is necessary that the glass mat thickness after pressure be so selected that the value Tg/Tp is at least 0.5.

The structure of positive and negative plates, and especially the structure of the positive plate, must be suitably designed for effective pressure to be applied thereto. For a lead-acid battery intended for use with an electric vehicle, it is necessary that the weights of parts which do not directly concern the charge-discharge reaction be reduced in order to increase the energy density of the battery. The grid of a plate serves as a conductor which supports the active material and conducts the charge and discharge current. Therefore, it is not suitable that the weight is decreased by, for instance, increasing the mesh size of the grid.

Figure 5:
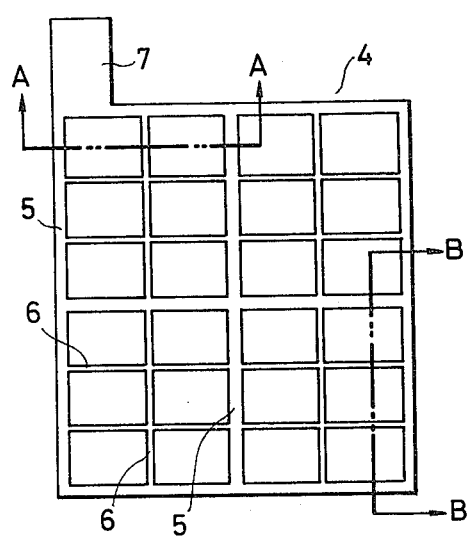
FIG. 5 is a diagram showing the fundamental construction of a grid in a lead-acid battery according to the invention.
Figure 5A:
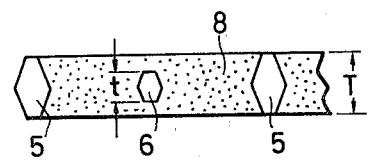
FIGS. 5a and 5b are sectional views taken along lines A—A and B—B in FIG. 5, respectively, showing the grid after it has been filled with paste.
Figure 5B:
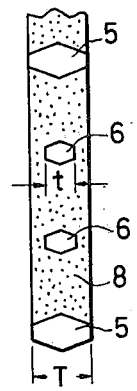

A grid employed in a pasted type lead-acid battery according to the invention is light in weight and excellent in its pressure effect. An example of a grid according to the invention is shown in FIG. 5. This is a typical example of a grid used in a pasted type lead-acid battery according to the invention. In FIG. 5, reference numeral 4 designates a grid made of a lead-antimony alloy or a lead-calcium alloy, 5 designates main members, 6 designates small members, and 7 designates a lug. The configurations of the main and small members 5 and 6 are as shown in FIGS. 5a and 5b. More specifically, the thickness of T of the main members 5 is substantially equal to the thickness of a plate once it has been filled with paste while the thickness t of the small members 6 is ⅓ to ⅔ of the thickness T of the main member 5. Accordingly, the small members 6 are buried completely in the active material 8. Thus, the pressure applied to the surface of the plate is essentially unobstructed by the members of the grid. That is, the active material 8 can be effectively pressurized. The cross-section of each small member 6 can be made quite small making the weight of the grid also quite light which facilitates increasing the energy density of the battery. If the members of the grid of the positive plate are merely made thin, the grid may tend to break easier by corrosion, and the positive plate may deteriorate quicker. However, since the configuration of the grid described above should be maintained, the small members of the grid covered with the active material are not brought into direct contact with the electrolyte. Thus, even if the cross-sectional area of each small member 6 is reduced, the plate can still sufficiently withstand the charge and discharge operations. Although the small members are covered with the active material, that is, they do not extend above the surface of the active material layer, the active material never sheds because the active material layer is maintained under pressure.

In order to more effectively apply the pressure and to maintain it during use, not only the glass mat construction and the grid structure as described are essential, but also the technique applied for pressurizing the assembled element and the construction of the container housing the assembled element are important. Examples of a preferred technique for pressurizing the assembled element and the construction of a battery container which is suitable for the pasted type lead-acid battery according to the invention will be described with reference to FIGS. 6, 7 and 8.

Figure 6:
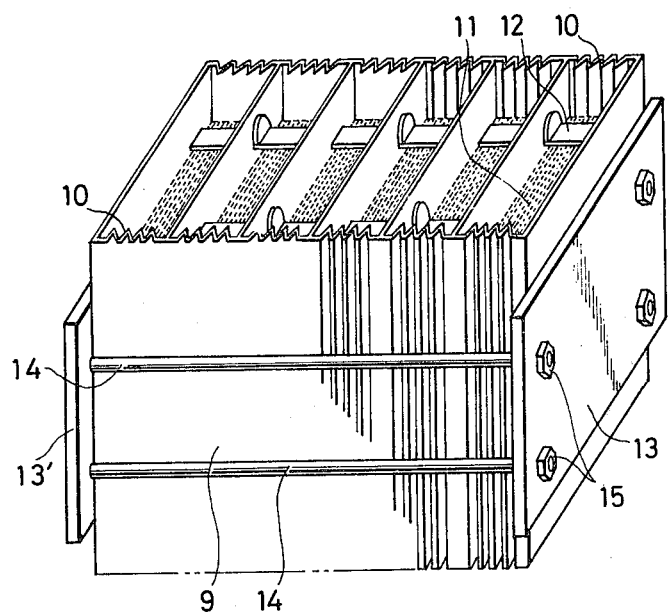
FIG. 6 is an explanatory diagram showing the essential components of an example of a container employed with a pasted type lead-acid battery which includes stretchable pleat-shaped parts which mechanically pressurize the assembled elements arranged therein through both end walls of the container.

In FIG. 6, assembled elements 11 are inserted into a container having stretchable pleat-shaped wall parts 10. The assembled elements are pressurized by tightening two hard plates provided on opposite ends of the container. In FIG. 6, reference numeral 9 designates a six-cell monoblock container which may be made of polypropylene, polyethylene or polypropylene-polyethylene copolymer resin. For each cell, the aforementioned stretchable pleat-shaped wall part 10 forms two side walls of the container which run parallel to the length direction of the assembled element and the bottom of the container. In FIG. 6, reference numeral 12 designates a connector and strap of the assembled elements 11 and a cell, while 13 and 13' designate the aforementioned hard plates for pressurizing which are provided on the two opposite ends of the container, and which are parallel to the surfaces of the plates in the two outermost cells in the momoblock container. The hard plates 13 and 13' are metal plate or plastic plates in which a metallic plate or frame such as, for example, aluminum is embedded. The hard plates 13 and 13' are provided with bolts 14 and nuts 15, the bolts 14 extending outside of and adjacent to the longer side walls of the container. The assembled elements 11 in the monoblock container are pressurized by tightening the hard plates 13 and 13' by means of the bolts 14 and the nuts 15. In this case, the assembled element can be pressurized simply and positively to a desired pressure level.

In stacking the assembled element 11 one upon another, the connector and strap 12 described above are welded to the plate lugs after the assembled element 11 has been pressurized. When the pressure applied is released, the lower portions of the assembled element 11 will expand making it difficult to insert into a conventional container for the assembled element in a battery of the invention. However, the assembled element 11 can be readily inserted into the container 9 which has the stretchable pleat-shaped parts 10 according to the invention. As the pressure applied to the assembled element does not directly act on the container 9 itself, the container 9 may have a low strength and therefore the weight of the container 9 is reduced. A pressed-type lead-acid battery thus constructed is suitable for an assembled element to which a relatively large pressure is applied.

Figure 7:
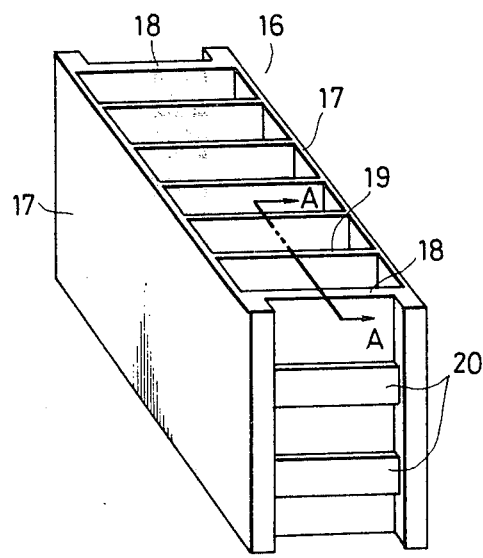
FIG. 7 is a perspective view showing another example of a container employed with a pasted type lead-acid battery according to the invention.
Figure 7A:
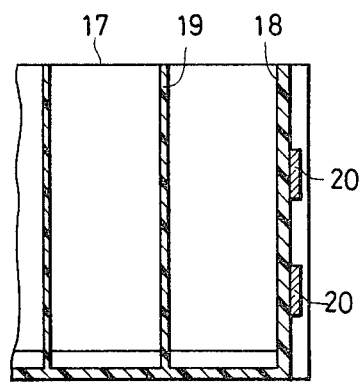
FIG. 7a is a sectional view taken along line A—A in FIG. 7.
Figure 8:
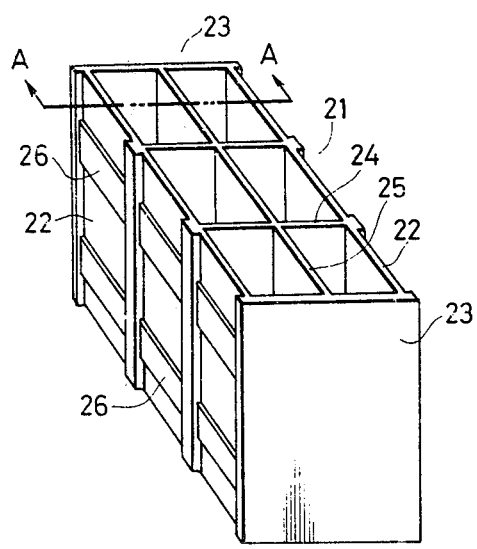
FIG. 8 is a perspective view showing a further example of a container employed with a pasted type lead-acid battery according to the invention.
Figure 8A:
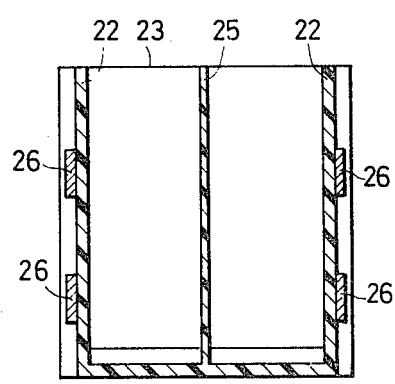
FIG. 8a is a sectional view taken along line A—A in FIG. 8.

In the case where the degree of pressure applied to the assembled element is relatively small, for example, on the order of 40 kg/dm², a container shown in FIG. 7 or 8 is also suitable.

The container shown in FIG. 7 is made of a thermoplastic resin such as a polypropylene or polyethylene-polypropylene copolymer resin. Six cells, for example, may be aligned to form rows to thus provide the assembled element. The container has side walls 17 extending perpendicular to the plates, end walls 18 parallel to the plates, and partitions 19 separating the cells.

The assembled element including positive and negative plates, separators and glass mats can be forcibly inserted into the container while being compressed so that each assembled element is subjected to a pressure of about 40 kg/dm². In this operation, the maximum stress is exerted in the end walls 18 of the container 16 as a result of which the end walls 18 are bent or expanded which may decrease the degree of pressure applied to the assembled element and may break the container. In order to overcome this, that is, in order to reinforce the end walls 18 of the container, according to the invention, reinforcing frame members 20 are embedded in the end walls 18. The material of the reinforcing members preferably has a higher elastic coefficient than the material of the container and is as light as possible. Thus, light metal such as aluminum alloy or plastic reinforced with glass fibers or carbon fibers is suitable for the reinforcing members. The side wall reinforcing members may be formed integrally with the container by inserting them in a mold when the container is being molded or they may be provided on the outside of the container after its formation.

FIG. 8 shows an example of a monoblock container in which the arrangement of the assembled element is different from that in FIG. 7. In the container shown in FIG. 8, six cells are provided in such a manner that two cells are aligned in each of three lines parallel to the longitudinal direction of the assembled element. The container 21 is made of a thermoplastic resin such as polypropylene and has end walls 22 parallel to the plates plane, side walls 23 perpendicular to the plates plane, and partitions 24 and 25 separating the cells. Within the container 21, stress due to the pressure applied to the assembled element is concentrated in the end walls 22. Accordingly, it is necessary to reinforce the end walls 22 with aluminum alloy frames 26 or the like similar to the container shown in FIG. 7.

Figure 9:
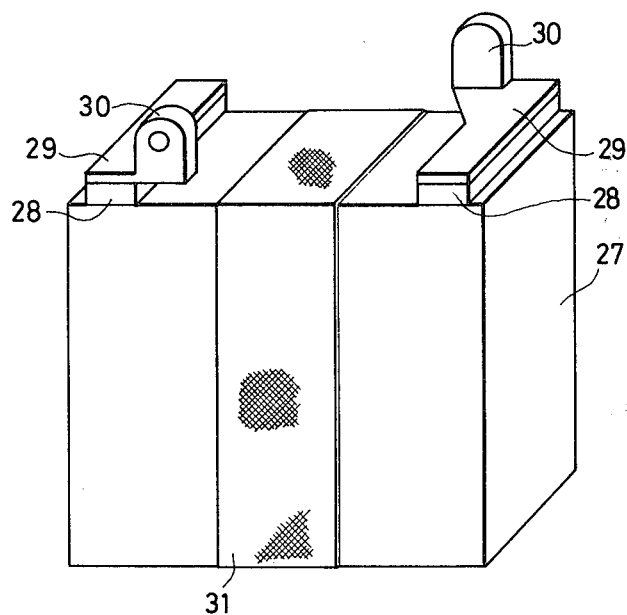
FIG. 9 is a diagram used in a description of an example of a technique for pressurizing the assembled element in a pasted type lead-acid battery according to the invention in which a belt-shaped member is used to tightly bind together the plates.

In addition to the above-described construction techniques, a technique of fixedly compressing an assembled element by directly binding them may be employed to provide pressure on the assembled element as shown in FIG. 9. In FIG. 9, reference numeral 27 designates an assembled element including positive and negative plates, separators and glass mats, 28 plate lugs, 29 straps, and 30 connectors. The elements 27 are tightly bound together with a belt-shaped member 31 which may be a synthetic resin tape, belt or band. In applying pressure to the assembled element with the belt-shaped member 31, the elements may be tightly bound after thin plates made of a synthetic resin having a high bending strength have been placed on both ends of the assembled element. The element 27 can be bound together with the belt-shaped member 31 using one of a variety of available conventional techniques. For instance, the binding operation can be readily achieved by using a strapping machine commonly employed in packaging work. The belt-shaped member around the assembled element may be removed after the assembled element has been inserted into the container or it may be left as it is in the container.

As is apparent from the above description, in a pasted type lead-acid battery according to the invention, the assembled elements are maintained under pressure so that failure of the positive plates is prevented during deep charge and discharge cycling whereby the service life of the battery is very significantly increased. Accordingly, a lead-acid battery of the invention is quite suitable as the drive power supply of an electric vehicle or the like . One of the specific features of a lead-acid battery according to the invention is that the service life is excellent, more than twice that of the conventional pasted type lead-acid battery. Furthermore, a lead-acid battery of the invention is meritorious in that its capacity is very little reduced during its service life.

Figure 10:
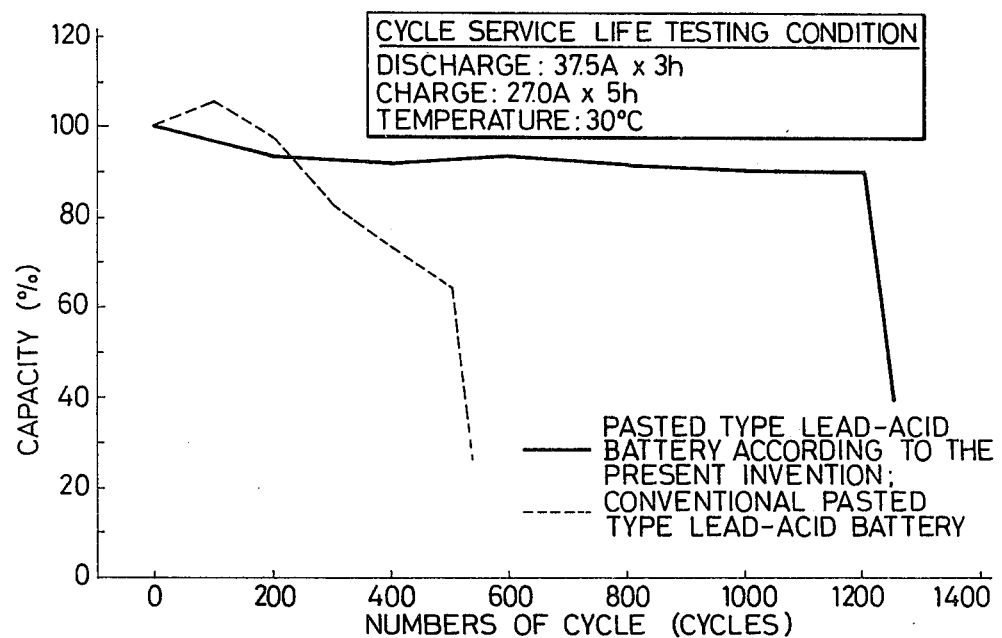
FIG. 10 is a graphical representation for comparing variations in capacity of a pasted type lead-acid battery of the invention in cyclical deep charge and discharge life test with those of a conventional pasted type lead-acid battery.

FIG. 10 indicates variations in the capacity of a pasted type lead-acid battery of the invention and a conventional pasted type lead-acid battery during a constant current cycle life test. The battery constructed in accordance with the invention and the conventional battery utilized in the test had the same positive and negative plates and used the same quantity of active material. Both of the batteries had a capacity of 150 Ah at a 5 hR discharge and an energy density of 45 Wh/kg. However, it should be noted that the degree of pressure applied to the assembled element in the dry state, before the electrolyte was poured into the container, of the lead-acid battery of the invention was 40 kg/dm$^2$ while that of the conventional one was 7 kg/dm$^2$. The glass mat used in the lead-acid battery of the invention was of the dual structure composed of a layer of glass fibers 0.3 $\mu$m in diameter and a layer of glass fibers 19 $\mu$m in diameter while the glass mat in the conventional lead-acid battery had a single layer of glass fibers 19 $\mu$m in diameter. It is apparent from FIG. 10 that the cycle life of the lead-acid battery of the invention is excellent. Moreover, it is to be noted that, for up to 1200 cycles during the life test, the capacity is stably maintained at 90% of the initial capacity.

A pasted type lead-acid battery according to the invention has significant merits in that it can completely eliminate the defects accompanying a conventional pasted type lead-acid battery in which the service life of the battery is decreased by deep charge and discharge cycling. The pasted type lead-acid battery according to the invention has a high energy density and the service life is long. Thus, the pasted type lead-acid battery according to the invention is most suitable as a driving power source which is cyclically operated, for instance, in an electric vehicle or a golf cart.

What is claimed is:

1. A pasted type lead-acid battery comprising: a plurality of positive and negative plates which comprises grids of lead-based material pasted with an active material; separators for separating said plates; a plurality of glass mats in contact with surfaces of said positive plates; said glass mats having a dual layer structure comprising a first layer of glass fibers in contact with said surfaces of said positive plates and having a diameter of no more than 1 $\mu$m and a second layer of glass fibers having a diameter of at least 10 $\mu$m; a battery container in which are disposed assembled elements comprising said plates, said separators and said glass mats, pressure being applied to said assembled elements within said container, said pressure being within a range of 20 to 80 kg/dm$^2$ without electrolyte in said container.

2. A lead-acid battery as claimed in claim 1, in which said first layer of said glass mat has openings 0.1 to 2.0 mm in diameter the total area of which is not more than 30% of the geometrical surface area of said first layer.

3. A pasted type lead-acid battery comprising: a plurality of positive and negative plates which comprises grids of lead-based material pasted with an active material; separators for separating said plates; a plurality of glass mats in contact with surfaces of said positive plates; said glass mats having a dual layer structure comprising a first layer of glass fibers in contact with said surfaces of said positive plates and having a diameter of no more than 1 $\mu$m and a second layer of glass fibers having a diameter of at least 10 $\mu$m, said plates, said separators, and said glass mats comprising assembled elements; said glass mats having such characteristic as to provide a maximum reduction ratio of degree of pressure of the assembled elements when immersed in an electrolyte 30% or less than the degree of pressure of the assembled elements in its dry state; a battery container in which are disposed assembled elements comprising said plates, said separators and said glass mats; pressure being applied to said assembled elements within said container; said pressure being in a range of 20 to 40 kg/dm$^2$ without electrolyte in said container.

4. A lead-acid battery as claimed in claim 1, 2 or 3 wherein the thickness of said glass mat in a dry state and under a pressure before electrolyte is poured into said container is at least one-half of the thickness of said positive plates.

5. A lead-acid battery as claimed in claim 1, 2 or 3, in which said grids have main and small members and which have a construction defined by: $t=(\frac{1}{3})T$ to $(\frac{2}{3})T$ where t is the thickness of said small members of said grids and T is the thickness of said main member of said grids, and wherein said small members are completely buried in said active material.

6. A lead-acid battery as claimed in claim 1, 2 or 3 in which said battery container comprises a monoblock container made of a thermoplastic resin and having a plurality of cells aligned in the longitudinal direction of said assembled elements, said container having stretchable pleat-shaped wall parts of each cell forming two side walls and the bottom of said container, said two side walls being perpendicular to the surfaces of said plates, two end walls of said monoblock container which are parallel with the surfaces of said plates being mechanically compressed to provide pressure on said assembled elements.

7. A lead-acid battery as claimed in claim 1 or 3 wherein said container comprises at least one reinforcing member positioned for reinforcing two end walls of said container which are parallel to the surfaces of said plates, said reinforcing member having a higher elastic coefficient than material forming said container.

8. A lead-acid battery as claimed in claim 1, 2 or 3 further comprising a belt-shaped member for binding said assembled elements for pressurizing said assembled elements.

9. A lead-acid battery as claimed in claim 1 or 3 wherein said container comprises at least one reinforcing member constructed of a material selected from the group consisting of metals and synthetic resins positioned at least partially covered with a surface of two end walls of said container which are parallel to surfaces of said plates, said reinforcing member having a higher elastic coefficient than material forming said container.

10. A lead-acid battery as claimed in claim 1, 2 or 3 further comprising a belt-shaped member for binding said assembled elements for pressurizing said assembled elements, said belt being constructed of a synthetic resin.

11. A lead-acid battery as claimed in claim 1, 2 or 3 wherein said lead-based material comprises a material selected from the group consisting of: lead, lead-calcium alloy, and lead-antimony alloy.

12. A lead-acid battery as claimed in claim 3, in which said first layer of said glass mat has openings 0.1 to 2.0 mm in diameter the total area of which is not more than 30% of the geometrical surface area of said first layer.

* * * * *